(No Model.)  H. BRANDENBURG.  4 Sheets—Sheet 1.
ELECTRIC RAILWAY.

No. 563,254.  Patented July 7, 1896.

Witnesses,  Inventor,
W. Ries Edelin.  Henry Brandenburg
E. L. Gilbert (No Model.) 4 Sheets—Sheet 2.
H. BRANDENBURG.
ELECTRIC RAILWAY.
No. 563,254. Patented July 7, 1896.
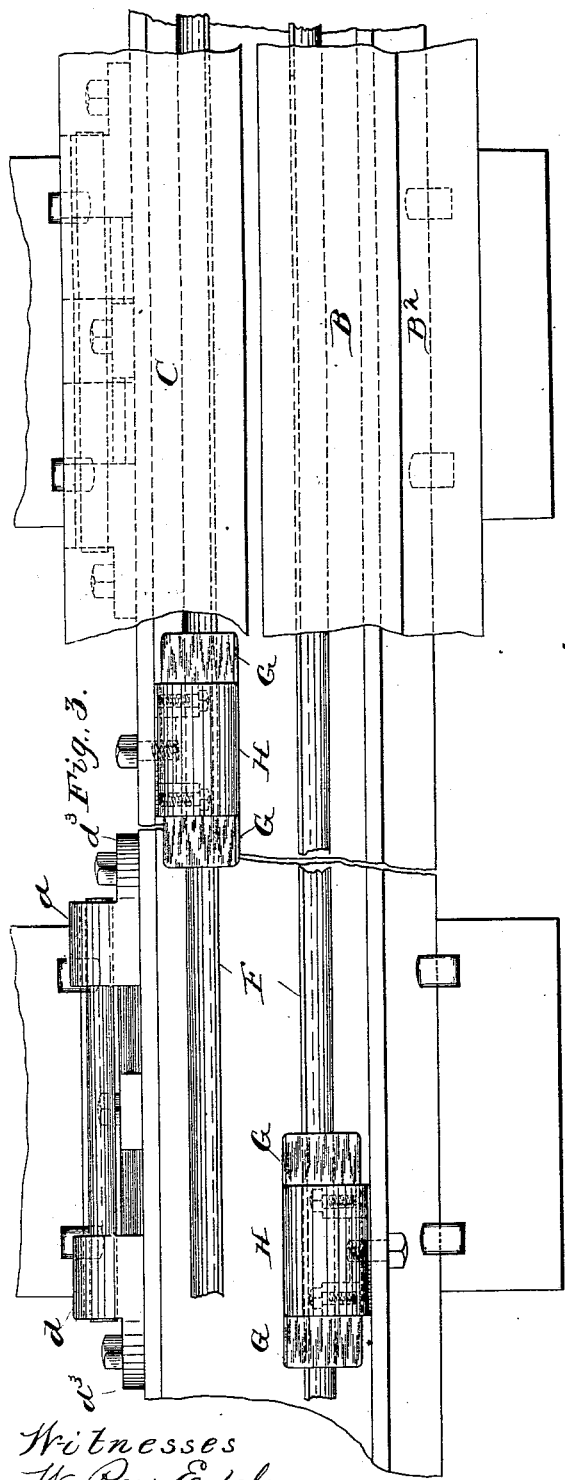
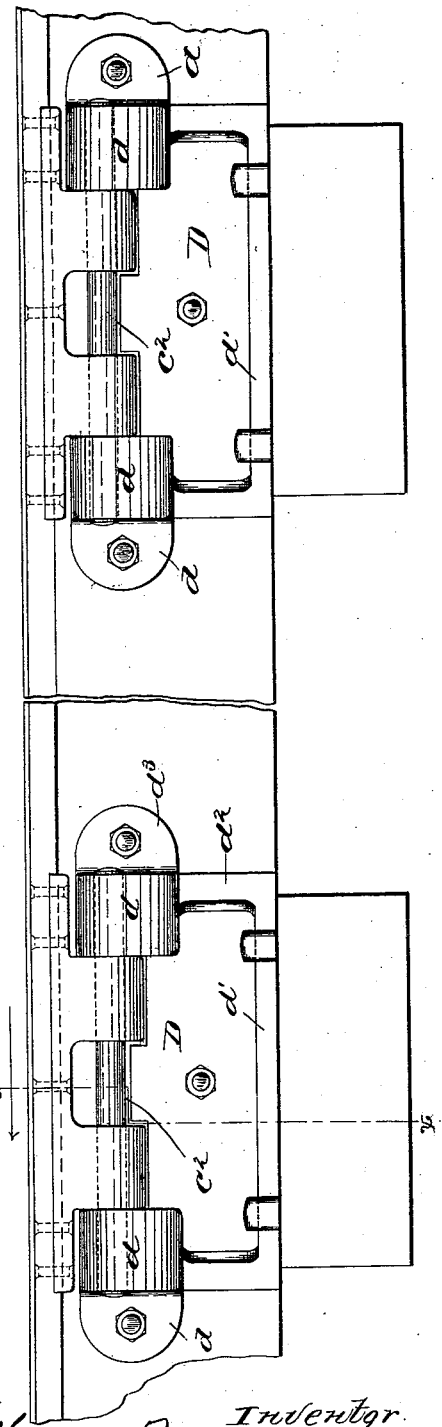
Witnesses
W. Rees Edelen
E. L. Gilbert
Inventor
Henry Brandenburg
THE NORRIS PETERS CO., PHOTO-LITHO., WASHINGTON, D. C.

(No Model.) 4 Sheets—Sheet 3.
H. BRANDENBURG.
ELECTRIC RAILWAY.
No. 563,254. Patented July 7, 1896.
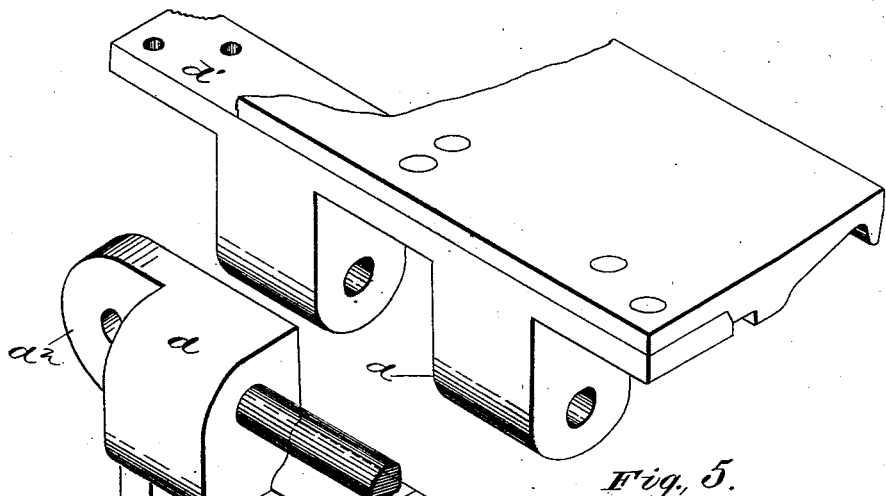
Fig. 5.
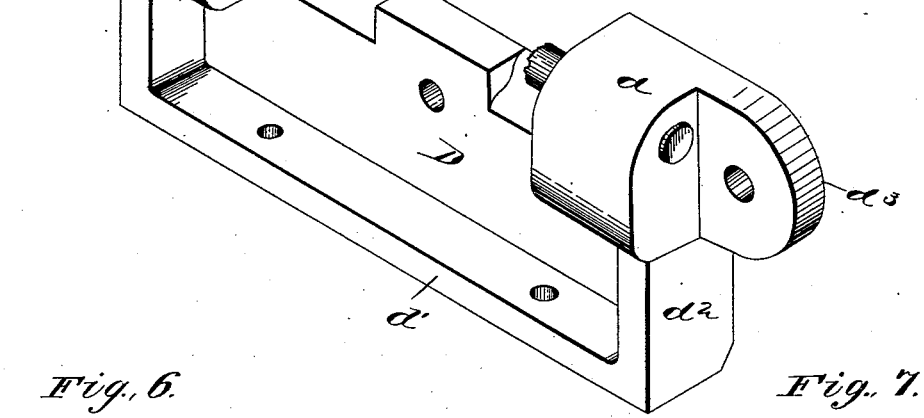
Fig. 6. Fig. 7.
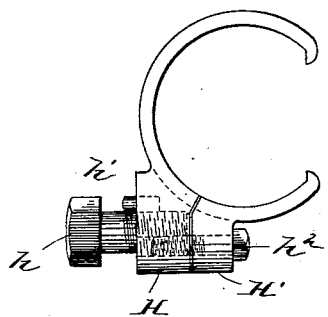
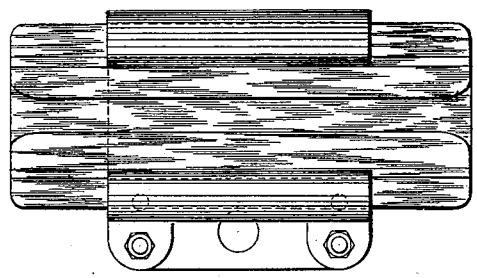
Fig. 8.
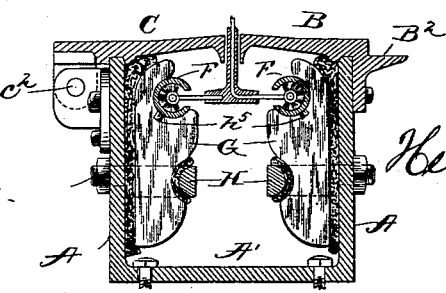
Witnesses.
W. Riss Edelin.
Ecle Gilbert
Inventor.
Henry Brandenburg (No Model.)
4 Sheets—Sheet 4.
H. BRANDENBURG.
ELECTRIC RAILWAY.
No. 563,254.
Patented July 7, 1896.
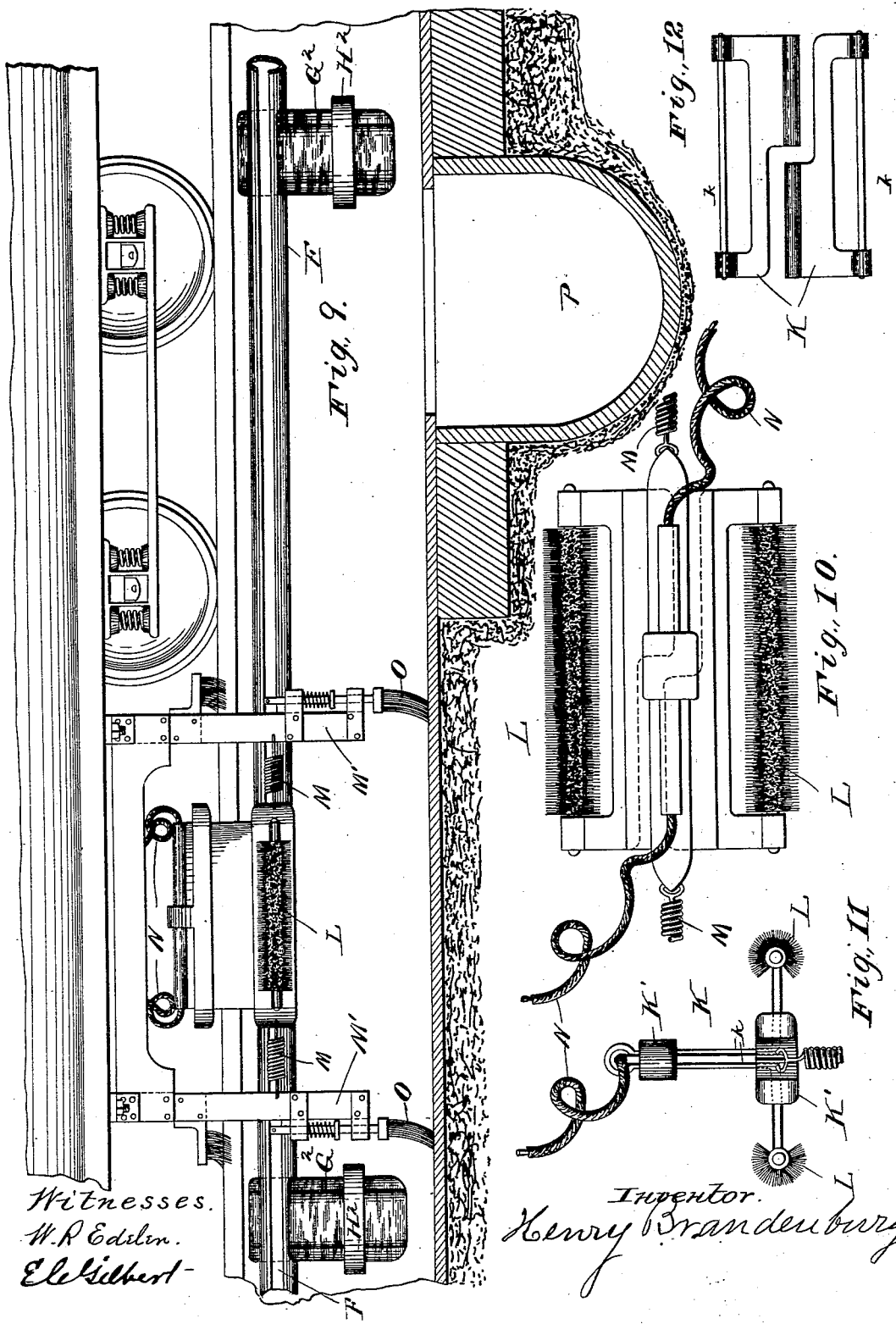

UNITED STATES PATENT OFFICE.

HENRY BRANDENBURG, OF CHICAGO, ILLINOIS, ASSIGNOR TO CHARLES AUSTIN BATES.

ELECTRIC RAILWAY.

SPECIFICATION forming part of Letters Patent No. 563,254, dated July 7, 1896.

Application filed April 16, 1895. Serial No. 545,921. (No model.)

*To all whom it may concern:*

Be it known that I, HENRY BRANDENBURG, of Chicago, in the county of Cook, State of Illinois, have invented certain new and useful Improvements in Electrical Railways; and I do hereby declare the following to be a full, clear, and exact description of the same, reference being had to the accompanying drawings, forming a part of this specification, and to the letters of reference marked thereon.

This invention relates to electric railways and particularly such as employ conduits for the conductors through which the electrical energy is transmitted with moving collectors or trolleys for each vehicle, and the invention has for its object to improve the mechanical construction of the conduit, the means for supporting the conductors within the conduit and for supporting and moving the collectors when coöperating with said conductors.

The invention consists in certain novel details of construction and combinations and arrangements of parts, all as will be now described, and pointed out particularly in the appended claims.

Figure 1:
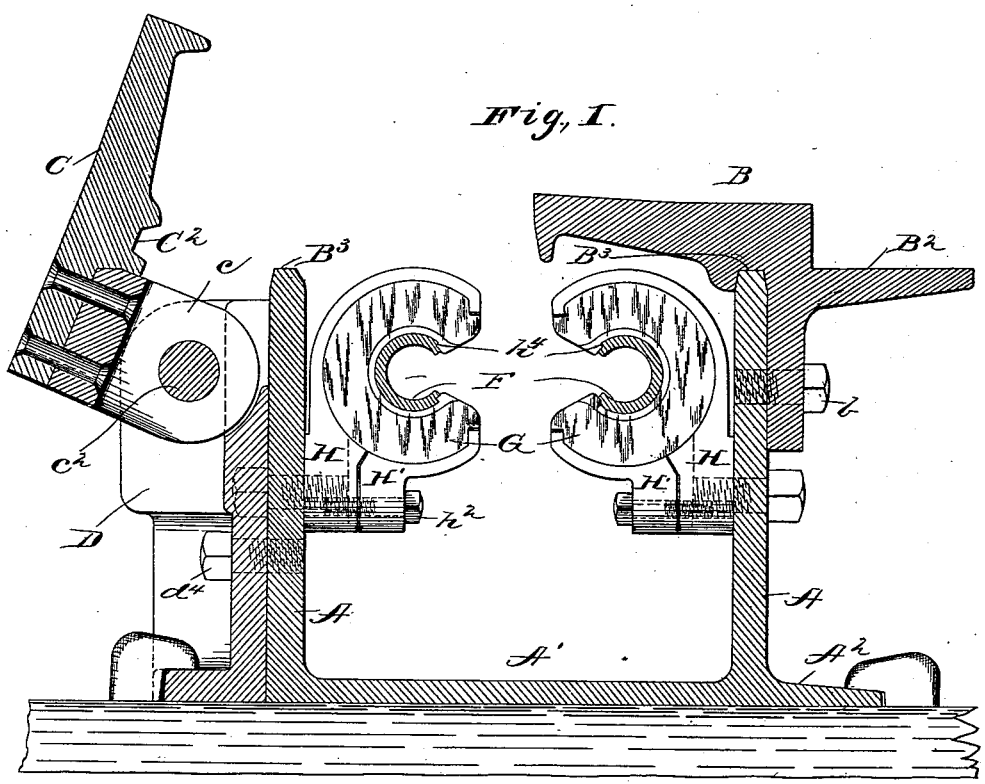
Figure 2:
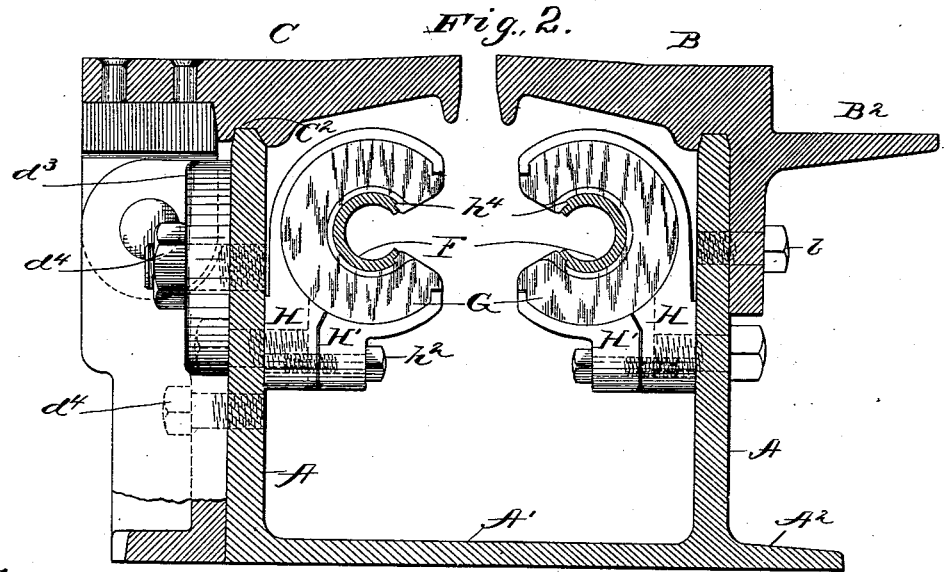

Referring to the accompanying drawings, Figures 1 and 2 are cross-sections through a conduit with conductors and supports constructed in accordance with my present invention. Figs. 3 and 4 are respectively a top plan and a side elevation of sections of a conduit, the slot-rails being shown partially broken away in Fig. 3 to illustrate underlying parts. Fig. 5 is a detail of the hinge for one of the slot-rails. Fig. 6 is an elevation of one of the conductor-supporting brackets. Fig. 7 is a top plan of the same with an insulator held thereby. Fig. 8 is a section illustrating a slightly-modified arrangement. Fig. 9 is a longitudinal section through the conduit, showing the conductor and movable contact or collector. Figs. 10 and 11 are a top plan and an end elevation, respectively, of the contact or collector. Fig. 12 is a detail top plan of the preferred form of frame for the contact or collector.

Like letters of reference in the several figures indicate the same parts.

Referring more particularly now to Figs. 1 to 4 and 9 it will be seen that the conduit proper is of such size as to overlie the cross-ties, being of approximately the depth of the usual rail and in fact, if desired, may itself constitute one of the rails, as will be presently described. The conduit is preferably rolled into shape with the two uprights or webs A, a connecting bottom portion A', and a flange or flanges $A^2$ for giving a more extended bearing on the ties and to facilitate the fastening of the conduit by spikes of the ordinary character. The slot-rails are also preferably rolled up into shape and one of them, especially if intended for one of the tracks, is secured permanently in place on one of the webs A. In the construction shown the slot-rail B is permanently attached to the web A by bolts $b$, passing through the downwardly-extending web B' of the slot-rail. Any approved shape may be given the top of the slot-rail above and outside of the web A to fit the car-wheel, (I have shown a simple shoulder and flange $B^2$,) and for the purpose of further strengthening the structure the edge of the web A is seated in the overhanging portion of the slot-rail at $B^3$.

The opposite or coöperating slot-rail C is in the present instance supported from the web A by a hinge connection in order that the interior of the conduit may be conveniently reached for repairs or inspection. It is essential that this slot-rail should be of sufficient strength to resist the strains to which it is liable to be subjected by the passage over it of heavy weights, &c., and with a view to securing the maximum strength I provide on the under outer edge of the rail C a series of downwardly-extending pintle-lugs $c$. They may be cast and attached to the rail or formed integral with it, and for coöperation with them I provide a series of hinge-pieces D, each having lugs $d$, through which and the lugs $c$ the pintles $c^2$ are passed. In addition, the hinge-pieces are formed with a base-flange $d'$ and lateral end flanges $d^2$ to facilitate the attachment of the hinge-pieces and to further strengthen the device. In securing the hinge-pieces to the conduit, bolts $d^4$ are passed through the body of the hinge-pieces and preferably also through end ears $d^3$, provided for the purpose, and in addition the base-flange is spiked down to the ties, as shown in Figs. 1, 3, and 4.

The number of hinges employed for each rail is optional and dependent somewhat upon the strains to which the rail will be subjected in any locality. The rail itself, it will be observed from Fig. 2, rests on top of the web A of the conduit and is further provided with a seat $C^2$ for the edge of the rail. This construction of movable slot-rail is strong, durable, and simple in the extreme. The hinge connections are protected against injury and there is no danger of the conduit being opened accidentally.

The conductors F which I employ are preferably tubular with a longitudinal slot for the admission of the contact-arm, the contact or collector itself being adapted to travel along inside the conductor, as will hereinafter appear. The conductors F are supported by insulators G, having a slotted aperture in which the conductor lies, the insulators being in turn supported from the vertical web of the conduit.

In the preferred construction a two-part bracket H H' is employed, the part H being adapted to be bolted to the web A by a bolt $h$ and held against turning on the bolt by a pin or pins $h'$, while the part H', made separate simply as a matter of convenience in inserting the insulators, is fastened to the part H by a screw or screws $h^2$. (See Figs. 6 and 7.)

When desired, the insulators may be elongated vertically, as shown at $G^2$, Fig. 8, and held in place by yokes $H^2$, bolting through the sides of the conduit or webs.

The insulators in every instance are provided with a shoulder or shoulders to prevent the rotation of the conductors. Thus in Figs. 1 and 2 it will be seen that shoulders $h^4$ are provided at each side of the slot against which the edges of the conductor abut, and in Fig. 8 a recess is formed for the reception of a fin at $h^5$, the effect in both instances being the same—i. e., to hold the slots in the insulators and conductors in alinement and the conductors in position to receive the collectors.

The conductors F are arranged on opposite sides of the conduit with the slots toward the center of the conduit, and being tubular, as described, they form supporting-guideways in which a collector of special construction may ride without danger of being pulled out of engagement with the conductor.

The collector employed in carrying the present invention into practical operation consists in the main of a pair of angle-plates K, Figs. 11 and 12, held together by an insulating body portion or portions K'. The lower arms of the plates project in opposite directions and at the ends support rods or equivalent devices $k$, upon which the collecting-brushes L are mounted. These brushes are in effect long cylinders having a large number of yielding metallic points adapted to sweep along the inside of the conductors. They should be supported at the proper distance apart to insure their entry into the conductors which then form the supports and guides, the collector being simply towed along by the vehicle through a flexible connection or spring, such as M, attached to the end of the collector and to a plate M', projecting from the vehicle through the slot.

To enable the vehicle to run in either direction, the towing mechanism is preferably duplicated at each end, but by reason of the flexible and yielding connection no irregularities in the movement of the car will affect the circuit through the collector. The current may, if convenient, be taken from the collector in any preferred manner, as by wires N, for running the motor, and, if desired, the plates M' may carry spring-pressed conduit-cleaning brushes O, adapted to sweep any accumulations in the conduit into catch-basins P, located between the ties at suitable intervals.

When in constructing the conduit it is not desired to extend the hinge-pieces down to the bottom of the conduit, said pieces may be simply bolted to the sides of the conduit or web, as illustrated in Fig. 8, in which instance the conduit may also be made without lateral flanges, and bolts or screws passed through from the inside for holding it in place.

Having thus described my invention, what I claim as new is—

1. The combination with the conduit formed with the integral upwardly-extending webs, of a slot-rail rigidly secured to one of said webs and a coöperating slot-rail hinged to the other web, and having a recessed seat for the edge of the web whereby the conduit may be readily opened; substantially as described.

2. The combination with the conduit formed with the integral upwardly-extending webs of a slot-rail having a seat for the edge of the web and a downward extension with fastening devices rigidly uniting the same to the side of the web; substantially as described.

3. In a conduit for electrical railways the combination with the upwardly-extending webs rolled integral with the base to form an integral trough, of slot-rails rolled with seats for the edges of the webs fastening devices rigidly uniting the slot-rail and web on one side and a hinged connection between the web and slot-rail on the other side; substantially as described.

4. The combination with a conduit having upwardly-extending integral side webs, of a slot-rail resting on said web and having independent pintle-lugs secured to its edge outside the web and independent hinge-pieces secured to the conduit outside the web and having lugs coöperating with the lugs on the slot-rail to form a hinge connection; substantially as described.

5. The combination with the rolled conduit having integral upwardly-extending webs, a slot-rail having a recessed seat into which the edge of the web fits, and pintle-lugs outside of said seat, of an independent hinge-piece with which the pintle-lugs coöperate, having a base-flange for resting on the ties whereby the hinge-piece may be spiked in position and secured to the outside of the web; substantially as described.

6. The combination with the conduit, and the insulators supported by the side wall thereof and having the slotted cylindrical opening therethrough, of the slotted cylindrical conductor supported in the insulator and coöperating shoulders on the insulators and conductor for retaining the slots in line substantially as described.

HENRY BRANDENBURG.

Witnesses:
THOMAS DURANT,
ALEX. S. STEUART.